Feb. 4, 1941. P. A. LOCKE 2,230,304
LIQUID HEATING AND DISPENSING DEVICE
Filed July 19, 1938 2 Sheets-Sheet 2

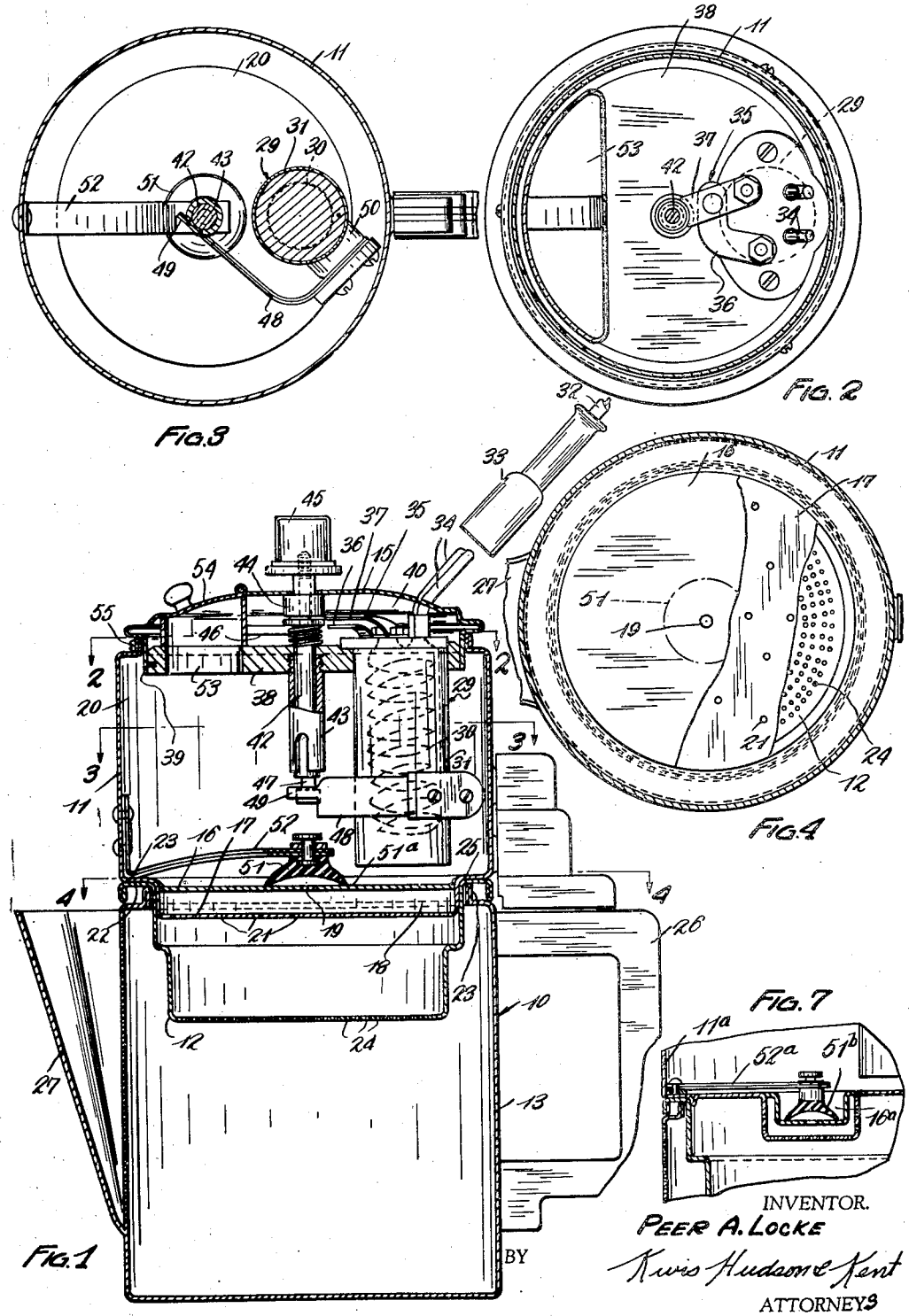

INVENTOR.
PEER A. LOCKE
BY
ATTORNEYS

Patented Feb. 4, 1941

2,230,304

UNITED STATES PATENT OFFICE 2,230,304

LIQUID HEATING AND DISPENSING DEVICE

Peer A. Locke, Ravenna, Ohio

Application July 19, 1938, Serial No. 220,022

4 Claims. (Cl. 219—44)

This invention relates to devices for heating and dispensing liquid, and more particularly to an improved construction which is well suited for use in coffee making utensils, stills, and various other devices of this character.

An object of my invention is to provide an improved device for liquid heating in which an electric heating unit is arranged to be in direct heat-transfer relation to the liquid to be heated and thermostatic means for controlling the operation of such unit is in direct heat-transfer relation thereto.

Another object of my invention is to provide improved liquid heating means embodying an electric heating unit whose operating temperature is dependent upon the reciprocal cooling effect of the liquid thereon and in which thermally responsive control means for the unit is arranged relative to the unit to be actuated in response to a predetermined change in the temperature thereof.

Another object of my invention is to provide an improved construction for coffee making utensils and other devices, in which an electric heating unit is arranged to extend into the body of the liquid to be heated but is spaced from the bottom of the chamber containing such liquid, and in which control means for the heating unit includes a bimetallic member mounted on the unit and adapted to be actuated in response to a predetermined change in the temperature of the unit.

Still another object of my invention is to provide an improved device for dispensing heated liquid, in which a valve member controls the discharge of liquid and a thermally responsive member disposed adjacent the bottom of the chamber so as to be submerged in the liquid causes opening of the valve member upon heating of the liquid to a predetermined value.

Yet another object of my invention is to provide an improved construction for coffee making utensils and other devices, in which an electric heating unit is arranged for contact with the liquid to be heated and a thermally responsive valve member operates to discharge the liquid when the temperature thereof reaches a given value, and in which control means operates automatically to discontinue the operation of the heating unit when substantially all of the liquid has been discharged.

A further object of my invention is to provide an improved device, of the type referred to, in which the control means for the heating unit includes a switch biased toward open position but adapted to be manually closed, and a bimetallic spring mounted on the heating unit and adapted to be actuated to permit opening of the switch upon a predetermined increase in the temperature of the unit.

My invention may be further briefly summarized as consisting in certain novel combinations and arrangement of parts hereinafter described and particularly set out in the appended claims.

In the accompanying sheets of drawings

Fig. 1 is a vertical sectional view taken through a liquid heating and dispensing device embodying my invention, the device shown in this instance being a coffee making utensil;

Fig. 2 is a transverse sectional view taken through the upper portion of the device as indicated by section line 2—2 of Fig. 1;

Fig. 3 is another transverse sectional view taken on line 3—3 of Fig. 1;

Fig. 4 is another transverse sectional view taken through the device of Fig. 1 as indicated by section line 4—4;

Fig. 7 is a partial vertical sectional view taken through a device similar to that of Fig. 1 but showing another arrangement for the discharge valve.

Figures 5, 6:
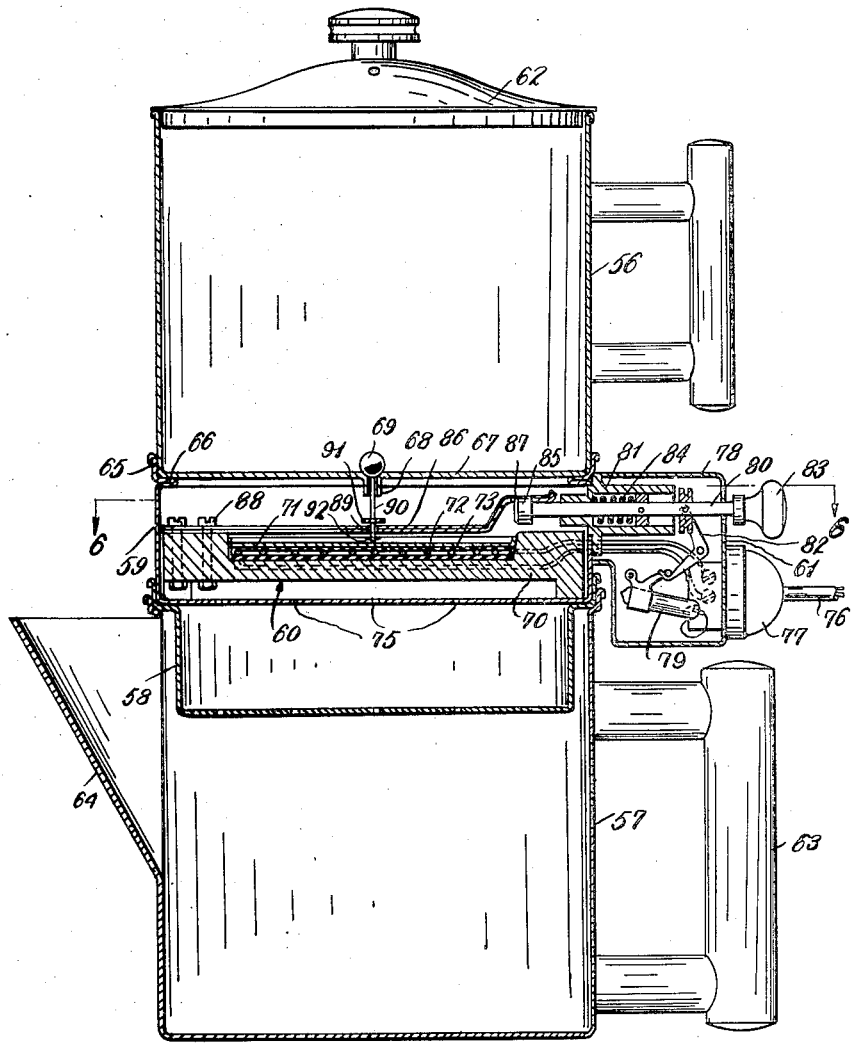
Fig. 5 is a vertical sectional view taken through another liquid heating and dispensing device of my invention.
Fig. 6 is a transverse sectional view of the device taken on line 6—6 of Fig. 5.

Further reference will now be made to the drawings for the purpose of describing more in detail the construction and operation of my improved liquid heating and dispensing device. Before proceeding with the more detailed description, however, it should be understood that although the drawings show coffee making utensils as representing one form of practical use to which my improved arrangement may be put, the invention is not to be regarded as limited in this respect because it can also be readily embodied in stills and other related apparatus.

In Fig. 1 of the drawings I show my invention embodied in a coffee making utensil 10 is of the sectional type and comprises a water storing and heating section or container 11, a coffee basket or container 12 and a pot or container 13 adapted to hold the brewed coffee. As is usual in devices of this character, the container 11 forms the upper section, the container 13 the lower section and the basket 12 forms an intermediate section which is disposed between such upper and lower sections. Since the embodiment of the invention shown in Fig. 1 is a coffee making device, the liquid to be stored and heated in the section 11 may be appropriately referred to as water, but it should be understood that within the scope of the invention, the substance to be heated may be water or any other liquid.

The container section 11 may be constructed as a generally cylindrical tank having an opening at the top thereof adapted to be closed by the lid 15 and at its lower end having spaced bottom plates or walls 16 and 17 providing a chamber 18 therebetween. The wall 16 may have an opening 19 therein for discharging the heated water from the main chamber 20 into the chamber 18 and the other bottom wall 17 may have perforations 21 therein for discharging the heated water into the basket 12 and distributing the same over the coffee contained in the basket.

The intermediate section of the device, that is, the basket 12, may be a cup-like sheet metal member adapted to extend into the upper end of the lower container section 13 and to be suspended therein by means of its outturned annular flange 22 overhanging the rim 23 surrounding the top opening of the lower container section. The basket is provided with a perforated bottom 24 which permits the water to drain into the lower container section 13 after passing through the coffee contained in the basket. The bottom of the upper container section 11 preferably has an annular shouldered or recessed portion 25 whereby this section may be supported on the overhanging flange 22 of the basket with a portion thereof telescoping into the basket. The interfitting engagement thus secured between the upper, intermediate and bottom sections of the utensil provides for supporting and retaining the sections in the desired arrangement.

The bottom section 13 may consist of a pot-like vessel or container in which the brewed coffee may be stored. This container section may have the usual handle 26 and pouring spout 27.

For heating the body of water contained in the upper container section 11, I provide an electric heating unit 29 which is arranged in direct heat-transfer relation to the body of liquid, preferably though not necessarily, by being mounted on the lid 15 so as to extend into the chamber 20 and the body of water therein when the lid is applied to the upper container section. The heating unit 29 is of the type having an electric resistance element 30 therein and may have a metal shell or cover 31 permitting heat to be readily transferred to the water. Electric heating current may be supplied to the unit 29 from an available lighting circuit through a conductor cord 32 having a plug 33 adapted to be applied to the terminals 34.

As a means of controlling the operation of the heating unit 29 I provide a switch 35 in the circuit which includes the resistance element 30. Although any suitable switch may be used for this purpose I show, by way of example, a switch comprising a stationary switch arm or contact 36 and a resilient switch arm or contact 37 adapted to be moved or deflected into engagement with the former for closing the circuit. As will be presently explained more in detail, I prefer to provide for closing of the switch 35 manually and automatic opening thereof when the temperature of the unit 29 increases to a predetermined value. As shown in Fig. 1, the switch may be conveniently located on the lid 15 adjacent the upper end of the heating unit 29. When the unit and switch are to be mounted on the lid I prefer to construct the latter with a transverse relatively rigid bottom plate 38 which may be connected around its outer edge with the flange 39 of the lid and upon which the switch and unit may be mounted. The spacing of the bottom plate 38 of the lid from the top wall thereof provides a space or chamber 40 in which the switch contacts, electrical connections and certain other parts may be conveniently housed and sealed against contact with the water or accidental human contact.

For the manual closing of the switch 35 I provide an actuating spindle or shaft 42 which may be arranged to extend vertically through the lid 15 and may be slidably guided in a sleeve 43 which is mounted on the plate 38 and projects from the underside thereof. The outer end of the resilient switch arm or contact 37 is connected to the spindle 42 by an insulating bushing 44 or other suitable means so that movement of the spindle downwardly, that is, inwardly of the container section 11, will cause this arm or contact to be sprung into engagement with the stationary switch contact 36 to thereby close the circuit for the heating unit 29. For convenience of actuation the spindle 42 may have an insulating knob or handle 45 mounted on the upper end thereof. The switch arm 37 and the spindle 42 are preferably biased toward open position so as to facilitate the automatic actuation to be presently explained and, for this purpose, I provide a compression spring 46 around the spindle between the lower end of the bushing 44 and the plate 38.

As a part of the means for causing automatic actuation of the switch 35 I provide locking means adapted to hold the switch closed during the heating of the water by the unit 29 and to be automatically released to permit opening of the switch when the temperature of the water has been elevated to a predetermined value. This locking means may comprise a groove or recess 47 formed in the spindle 42 adjacent its inner end and a thermally responsive member adapted to cooperate with such groove or recess and arranged in direct heat-transfer relation to the unit 29. This thermally responsive unit is preferably in the form of a bimetallic spring 48 having a finger or trigger portion 49 engageable in the groove 47 of the spindle. The bimetallic spring 48 is mounted on the unit 29 in metal-to-metal contact with the shell 31 thereof so as to provide a direct heat-transfer relation between the unit and spring. When the unit 29 is cylindrical in form it may be desirable to locate a metal block 50 between the spring and the shell of the unit for convenience in mounting or anchoring the spring thereon.

It is important to note that the heating unit 29, in this instance the lower end thereof, is in adjacently spaced relation to the bottom of the container section 11. This is of importance in the functioning of the heating unit and the thermally responsive control therefor, as will now be explained. When the water to be heated has been poured into the container section 11 and the lid 15 arranged in place with the unit 29 extending into the body of water, the switch is closed by pushing downwardly on the knob 45. This actuation of the knob and spindle causes closing of the contacts 36 and 37 and also permits the finger or trigger 49 of the bimetallic spring 48 to engage in the groove 47 and thus hold the switch in its closed position. During the heating of the water by the unit 29, the water exercises a reciprocal cooling effect on the unit and on the spring 48 which maintains the latter at a sufficiently low temperature to cause the finger 49 to be retained in locking engagement in the groove 47. When the water is removed from the container section 11 as by discharge thereof through the opening 19 or by boiling away into vapor, or in some other manner, the level of the water drops below the lower end of the heating unit and the above mentioned reciprocal cooling effect is removed. When this condition occurs the temperature of the unit 29 rises rapidly as does also the temperature of the spring 48 by reason of the heat being readily conducted thereto from the unit. Thereupon the bimetallic spring 48 is deflected causing the finger 49 to disengage from the groove 47 and this permits the compression spring 46 to elevate the spindle 42 and open the switch contacts 36 and 37.

In the movements of the spindle 42 during the above-explained manual and automatic actuation of the switch, the insulating bushing 44 and the insulating knob 45 may serve as stops which engage respectively against the inner and outer sides of the top wall of the lid 15 for limiting the travel of the spindle. This may be desirable to prevent injury to the bimetallic spring 48 when the switch is manually closed and also to prevent complete disengagement between the lower end of the spindle and the finger 49.

For controlling the discharge or dispensing of the heated water from the container section 11, I may provide a valve member 51 for controlling the opening 19 and means for causing automatic actuation of such valve member. The automatic valve-actuating means may comprise thermally responsive means, preferably a bimetallic spring 52 as shown in this instance, which may be mounted on the container section 11 so as to bias the valve member 51 toward closed position. As shown in Fig. 1, the bimetallic spring 52 is located in the chamber 20 of the container section 11 adjacent the bottom thereof so its temperature will correspond substantially with the temperature of the water adjacent the bottom of the chamber.

The valve member 51 may be connected with the spring 52 as by being mounted directly thereon. This valve member may be of any suitable form or construction, but I find that a disk-like body or member formed of soft rubber or rubber-like material serves very well. As shown in Figs. 1 and 2 the valve member 51 may have a concave seat-engaging portion surrounded by a rim which tapers to a relatively thin sharp annular edge 51a and is adapted to be pressed against the surface of the wall 16 by the bimetallic spring 52.

During the operation of the heating unit 29 the heated water will rise toward the top of the chamber 20 but the cooler water will be adjacent the bottom of the container and will tend to cause the spring 52 to maintain the valve member 51 closed. However, when the entire body of water has been heated to a given temperature, the spring 52 will deflect and will lift the valve member 51 away from the wall 16 and permit the heated water to discharge through the opening 19. When substantially all of the water has been discharged from the container section 11 and its level has dropped below the lower end of the heating unit 29, the temperature of the unit and of the spring 48 will quickly rise and cause automatic opening of the switch 35 in the manner explained above.

When the heating unit 29 and the switch mechanism 35 are mounted on the lid of the device, the weight of the lid may be increased thereby so that it is not convenient to remove the lid for pouring water into the container section 11. To avoid the need for removing the lid for this purpose I may provide the lid with an opening 53, through which the water may be poured, and with a secondary lid 54 for closing such opening. Fastening means, such as screws 55, may be provided for holding the lid in place but can be omitted if it is desirable to have the lid freely removable.

To improve the automatic actuation of the discharge valve I may provide a modified arrangement, as shown in Fig. 7, in which the bimetallic spring 52a can be located closer to the bottom of the container section 11a so that the valve member 51b will not be opened until substantially the entire volume of water in the container section is heated to the desired temperature. In this modified arrangement the bottom of the container section is provided with a pocket or recess 16a which accommodates the valve member 51b thus permitting the bimetallic spring to lie closer to the bottom wall.

In Figs. 5 and 6 of the drawings I show another embodiment of my liquid heating and dispensing device which utilizes the principle of operation above explained. This device is also in the form of a coffee making utensil and is generally similar to the device of Fig. 1 in that it comprises an upper container section 56 for containing a supply of water, a lower container section 57 for holding the brewed coffee and an intermediate section 58 in the form of a basket adapted to hold a supply of coffee. Instead of having the heating unit and automatic switch located in the water supply container or on the cover thereof, I provide a second intermediate container section 59 in which the heating unit 60 and switch mechanism 61 are arranged. The upper container section 56 may be provided with a suitable cover 62 for closing the same and the lower container section 57 may be provided with the usual handle 63 and pouring spout 64. The lower and intermediate container sections may be formed with flange and shoulder portions 65 and 66 providing for interfitting engagement or nesting of the container sections whereby they will be held in the desired assembled relation.

The upper container section 56 is constructed with a transverse bottom wall 67 having a metering opening or spout 68 for discharging water therefrom. A suitable valve member, such as the ball-shaped member 69 is arranged to seat by gravity for normally closing the discharge opening 68.

In this embodiment of my invention the heating unit 60 does not extend into the container section 56, but is arranged for contact with the water to be heated by reason of its being located below the discharge opening 68. The unit 60 may comprise a body or block 70 of suitable material, preferably metal, which is seated in the chamber of the intermediate container section 59 and has a shallow recess or pocket 71 in the upper side thereof accommodating an electric resistance heating element 72. A cover 73 may be arranged in the recess 71 over the resistance element to inclose and seal the latter against direct contact with the water to be heated. This cover may have an upturned marginal lip which engages the block and also serves to retain a shallow pool of water immediately above the element 72. The block 70 of the heating unit may have openings or cutaway portions 74 at the sides thereof providing for the passage of the heated water downwardly past the unit and through the perforations 75 into the basket 58.

Current for the heating unit 60 may be supplied through the conductor cord 76 and the plug 77 which cooperates with terminals provided in the switch housing 78. For controlling the operation of the heating unit I provide a suitable switch in the heating circuit, such as the mercury-tube switch 79 which is located in the switch housing 78. The switch 79 may be similar to the switch 35 of the device of Fig. 1 in that it can be closed manually and will be opened automatically when the operating temperature of the heating unit increases to a predetermined value.

For manually closing the switch 79 I may provide a spindle or shaft 80 which is slidable in a bearing sleeve 81 and which is connected with the switch by means of a rocking lever or link 82. The spindle 80 may be provided with an actuating knob or handle 83 at its outer end. A compression spring 84 surrounding the spindle acts thereon to urge the same toward an outer position corresponding with the open position of the switch 79.

To hold or lock the spindle 80 in its inner position corresponding with the closed setting of the switch 79, I provide the spindle with a collar or enlargement 85 adjacent its inner end and I provide the heating unit with a bimetallic spring 86 having a recess or opening 87 in which such collar engages. The spring 86 is normally biased toward engagement with the collar 85 so as to retain the switch 79 in its closed position after it has been closed by manual actuation of the knob 83. The bimetallic spring 86 may be mounted on the block 70, as by means of the screws 88, and extends transversely of the heating unit immediately above the element 72 and its sealing cover 73. In addition to serving as a locking means for the switch spindle 80 the bimetallic spring 86 may also be used for actuating the valve member 69. For the latter purpose the spring may have an opening 89 through which the depending stem 90 of the valve member 69 extends. Collars or shoulders 91 and 92 may be provided on the valve stem on opposite sides of the spring to form a lost motion operating connection for the valve whereby a predetermined deflection of the spring in one direction will cause opening of the valve member and a predetermined deflection of the spring in the opposite direction will assist gravity in closing the valve member.

The heating element 72 and the discharge opening 68 preferably have a definite relation to each other as to capacity, that is, the wattage of the element and the area of the discharge opening are such that the element will be able to heat the water to substantially the boiling temperature as fast as it is discharged onto the heating unit by the discharge opening. In addition, the relation of the parts should be such that the cooling effect of the water on the bimetallic spring 86 will be sufficient to prevent release of the spindle 80 during the normal water-heating operation.

In the operation of this embodiment of my invention a supply of water is placed in the container section 56 and a quantity of coffee is placed in the basket 58. The switch 79 is closed by manually pushing in the knob 83 whereupon the heating unit 60 becomes effective. The heat generated by the unit causes the bimetallic spring 86 to be deflected upwardly a distance sufficient to engage the collar 91 and lift the valve member 69. This permits water from the container section 56 to discharge downwardly onto the spring and heating unit where it is heated to or nearly to a boiling temperature before passing downwardly through the openings 74 and the perforations 75 into the basket 58. However, if the temperature of the unit 60 increases despite the reciprocal cooling effect of the water being discharged thereon or when the temperature f the unit increases upon substantially all of the water being discharged from the container section 56, the bimetallic spring will be deflected enough to disengage the collar 85 of the spindle 80. This will permit the spring 84 to move the spindle outwardly and to simultaneously shift the switch 79 to its open position thereby rendering the heating unit ineffective.

It is not necessary that the valve 69 be provided because, if desired, the passage 68 can be left open and the water to be heated can be poured into the container section 56 upon, or immediately after, the closing of the switch 79.

From the foregoing description and the accompanying drawings it will now be readily seen that I have provided an improved construction and arrangement for liquid heating and dispensing devices and which can be readily embodied in coffee makers, stills and various other devices of this character. It will be seen furthermore that in my improved arrangement the operating temperature of the electric heating unit is dependent upon the reciprocal cooling effect of the liquid being heated and that the thermally responsive control means for the heating unit is arranged relative to such unit to be actuated when the temperature of the latter increases to a predetermined value. In this way the device is rendered capable of automatically shutting off the current to the heating unit as soon as the heated liquid has been dispensed or has been boiled away. It will also be seen that I provide novel valve and valve control means for the discharge of the heated liquid whereby the valve is held closed until the temperature of the entire body of liquid has been increased to the desired value whereupon the valve will be opened automatically to discharge the heated liquid.

While I have illustrated and described my improved construction and arrangement for liquid heating and dispensing devices in a somewhat detailed manner, it will be understood, of course, that I do not wish to be limited to the precise details of construction and arrangements of parts herein disclosed, but regard my invention as including such changes and modifications as do not constitute a departure from the spirit of the invention and the scope of the appended claims.

Having thus described my invention, I claim:

1. In a device of the character described, a perforate container section adapted to contain a quantity of coffee, means providing a chamber located entirely above said container section and adapted to contain a body of water to be heated, a cover for said chamber, an electric heating unit suspended from said cover and extending into the chamber for contact with the water but spaced above the bottom of the chamber, a switch for said unit also mounted on said cover, means for discharging water from the chamber in response to heating thereof such discharge means being located adjacent the bottom of said chamber so that the discharge of water therefrom removes the water from contact with said unit, and means for causing opening of the switch when substantially all of the water has been discharged from said chamber comprising a thermal element mounted on the heating unit and adapted to respond to a predetermined increase in the temperature of the unit, said cover with said heating unit and switch being removable as an assembly from said chamber.

2. In a coffee maker, a plurality of container sections incuding an upper section adapted to contain water to be heated, an intermediate section for the coffee and a lower section for the brew, a cover for said upper section, an electric heating unit suspended from said cover and arranged to extend into the upper container section in spaced relation above the bottom thereof and the operating temperature of such unit being dependent upon the presence or absence of contact of some portion thereof with the water to be heated, means for discharging heated water by gravity from the upper section and thereby removing the water from contact with said unit into said intermediate section, a switch for controlling said heating unit, and a temperature responsive element mounted on said unit and adapted to cause actuation of the switch in response to a predetermined increase in the temperature of the unit.

2. In a coffee maker, a plurality of container sections including an upper section adapted to contain water to be heated, an intermediate section for the coffee and a lower section for the brew, a cover for said upper section, an electric heating unit suspended from said cover and arranged to extend into the upper container section in spaced relation above the bottom thereof and the operating temperature of such unit being dependent upon the presence or absence of contact of same portion thereof with the water to be heated, thermally responsive valve means in the upper container section adjacent the bottom thereof and operable to discharge heated water therefrom by gravity into said intermediate section and thereby removing the water from contact with said unit, a switch for controlling said heating unit, and a temperature responsive element mounted on said unit and adapted to cause actuation of the switch in response to a predetermined increase in the temperature of the unit.

4. A coffee maker, a plurality of container sections including an upper section adapted to contain water to be heated and having a discharge opening in the bottom thereof, an intermediate section for the coffee and a lower section for the brew, a cover for said upper section, an electric heating unit suspended from said cover and arranged to extend into the upper container section, said cover and heating unit being removable as an assembly from said upper section and said heating unit being spaced from the bottom of said upper section when the cover has been applied to such section, means for supplying electric current to said heating unit for heating the water, a valve in the upper container section normally closing the discharge opening thereof, and a temperature responsive element in the upper container section adapted to open the valve when the temperature of the water reaches a predetermined value to permit the heated water to be discharged by gravity into said intermediate container section and thereby remove from contact with said heating unit.

PEER A. LOCKE.